United States Patent Office 3,066,157
Patented Nov. 27, 1962

3,066,157
NOVEL DISULFAMYL-N-CARBOXY-
ACYLANILINES
Frederick C. Novello, Berwyn, Pa., assignor to Merck &
Co., Inc., Rahway, N.J., a corporation of New Jersey
No Drawing. Filed Dec. 27, 1960, Ser. No. 78,310
15 Claims. (Cl. 260—397.7)

This invention is concerned with novel disulfamyl-N-carboxyacylanilines having at least one sulfamyl group attached in ortho-position to the N-carboxyacylamino group. The preferred disulfamyl-N-carboxyacylanilines of this invention are those having at least one additional substituent attached to the benzene ring and wherein the N-carboxyacyl group is esterified. The carboxyacyl ester group advantageously is derived from an aliphatic dicarboxylic acid or an aromatic dicarboxylic acid. When the benzene nucleus contains at least one substituent in addition to the two sulfamyl and the N-carboxyacylamino groupings, it preferably is selected from the halogen or halogen-like radicals such as chlorine, bromine, fluorine, trifluoromethyl, trichloromethyl and the like, a lower alkyl radical preferably having from one to five carbon atoms, a lower alkoxy radical having advantageously from one to five carbon atoms or the nitro group.

The two sulfamyl radicals attached to the novel compounds of this invention can be either similar or dissimilar and may be the sulfamyl radical per se or the amide nitrogen may be a secondary or tertiary amide or it may be part of a heterocyclic ring such as the piperidine, morpholine or pyrrolidine ring. Other substituents which may be attached to the amide nitrogen are one or two lower alkyl radicals advantageously having from one to six carbon atoms.

In addition to the one additional substituent attached to the benzene ring described above, still another substituent can be attached to the benzene ring, preferably a halogen radical, such as a chlorine, or a lower alkyl group.

The remaining hydrogen attached to the aniline nitrogen also can be replaced, preferably by a lower alkyl substituent.

The novel disulfamyl-N-carboxyacylanilines of this invention possess diuretic, natriuretic and/or saluretic properties (hereinafter referred to as diuretic properties). These compounds therefore are useful in the treatment of abnormalities which produce an edematous condition in the body or which produce an imbalance in the electrolyte concentration in the body as, for example, those conditions in which abnormal retention of sodium occurs. The compounds find use especially in the treatment of edematous conditions, congestive heart failure and other abnormalities produced by an excessive retention of sodium. The disulfamyl-N-carboxyacylanilines are of particular interest because of their long duration of activity.

These compounds can be administered in therapeutic dosages in conventional vehicles as in the form of tablets, pills, capsules and the like as they are effective upon oral administration. However, they also can be administered parenterally in sterile solution if desired.

The compounds can be prepared by reacting the appropriate disulfamylaniline with an acid halide of the half ester of the selected aliphatic or aromatic dicarboxylic acid. The reaction takes place quite readily in the presence of a solvent with moderate heating. Refluxing of the reaction mixture for a few hours either gives the desired product in the form of a solid precipitate which can be separated by filtration or other known methods, or the end product can be obtained from the reaction mixture by evaporation of the solvent which gives the desired disulfamyl-N-carboxyacylaniline in good yields. The disulfamylanilines used as starting material in the above method can be prepared by the method described in U.S. Patent 2,809,194 or by other methods known in the art.

While the above discussion outlines a general method suitable for the preparation of the novel compounds of this invention it is to be understood that the method described above and the following examples which more fully describe the preparation of the compounds of this invention are illustrative of the method which can be employed and are not to be construed as limiting the invention to the particular methods or to the particular compounds specifically described.

EXAMPLE 1

5-Chloro-2,4-Disulfamyl-N-(Gamma-Carbomethoxy-butyryl)Aniline

A solution of 0.2 mole of 5-chloro-2,4-disulfamylaniline and 0.22 mole of gamma-carbomethoxybutyryl chloride in 450 ml. of dioxane is heated under reflux for about 24 hours. The reaction mixture thereafter is cooled and the product which precipitates is collected on the filter. After recrystallization from water there is obtained 5-chloro-2,4-disulfamyl - N - (gamma - carbomethoxybutyryl) aniline, M.P. 173–175° C.

Analysis calculated for $C_{12}H_{16}ClN_3O_7S_2$: C, 34.82; H, 3.90; N, 10.15. Found: C, 34.96; H, 4.20; N, 10.11.

EXAMPLE 2

5-Chloro-2,4-Disulfamyl-N-(Delta-Carbethoxyvaleryl) Aniline

By replacing the gamma-carbomethoxybutyryl chloride employed in Example 1 by an equivalent quantity of 5-carbethoxyvaleryl chloride and following substantially the same procedure described in Example 1, there is obtained 5-chloro-2,4-disulfamyl-N-(delta - carbethoxyvaleryl) aniline which, after recrystallization from a 50% mixture of alcohol and water, melts at 171–173° C.

Analysis calculated for $C_{14}H_{20}ClN_3O_7S_2$: C, 38.05; H, 4.56; N, 9.52. Found: C, 38.30; H, 4.72; N, 9.37.

EXAMPLE 3

5-Trifluoromethyl-2,4-Disulfamyl-N-Ethoxalylaniline

Step A.—2-amino-4-trifluoromethylbenzenesulfonic acid (32 g., 0.132 mole) is added portionwise with stirring to 100 ml. of chlorosulfonic acid and cooled in an ice bath over a 5–10 minute period. The solution is heated in an oil bath at 150° C. for three hours and then cooled to 20° C. Thionyl chloride (40 ml.) is added and the mixture heated on the steam bath for one hour, then cooled to 0° C. and poured cautiously onto ice. The aqueous liquor is decanted and the residual solid heated on the steam bath with 500 ml. of 28% ammonium hydroxide for 2 hours. Upon cooling the product precipitates and is collected on the filter, washed with water and dried. To remove a trace amount of 2-sulfamyl-5-trifluoromethylaniline that is obtained along with the product, the material remaining on the filter is digested with 500 ml. of boiling benzene, filtered and the benzene-soluble material recrystallized from aqueous alcohol yielding 2,4-disulfamyl-5-trifluoromethylaniline as colorless needles, M.P. 241–242° C.

Step B.—By replacing the 5-chloro-2,4-disulfamylaniline employed in Example 1 by an equivalent quantity of the product obtained as described above, and also replacing the gamma-carbomethoxybutyryl chloride employed in Example 1 by an equivalent quantity of ethoxalyl chloride, and following substantially the same procedure described in Example 1 there is obtained 5-trifluoromethyl-2,4-disulfamyl-N-ethoxalylaniline which, after recrystallization from a 50% mixture of alcohol and water, melts at 228° C.

Analysis calculated for $C_{11}H_{12}N_3F_3O_7S_2$: C, 31.50; H, 2.89; N, 10.02. Found: C, 31.61; H, 3.16; N, 10.06.

EXAMPLE 4

*5-Chloro-4-Sulfamyl-2-Methylsulfamyl-N-Ethoxalylaniline*

Step A.—A solution of 68.3 g. of 2-methyl-6-chloro-7-methylsulfamyl-1,2,4-benzothiadiazine-1,1-dioxide in 150 ml. of chlorosulfonic acid is heated for 5 hours on the steam bath (95° C.). The solution then is cooled and poured onto crushed ice whereup on a precipitate forms which is removed by filtration and then air-dried. After recrystallization from a mixture of acetone-hexane, there is obtained 43.2 g. of 2-methylsulfamyl-5-chloroaniline-4-sulfonyl chloride, M.P. 159–162° C.

Analysis calculated for $C_7H_8Cl_2N_2O_4S_2$: C, 26.34; H, 2.53; N, 8.78. Found: C, 26.99; H, 2.64; N, 8.72.

Step B.—The sulfonyl chloride (43.2 g.) obtained as described in Step A is added to 250 ml. of 28% ammonium hydroxide and the solution then is heated on the steam bath for one hour. After cooling a precipitate forms which is separated by filtration and air-dried yielding 25.2 g. of 2-methylsulfamyl-4-sulfamyl-5-chloroaniline, M.P. 185–188° C. Recrystallization from water raises the melting point to 189–191° C. An isomorphic form also exists that melts at 168–170° C.

Analysis calculated for $C_7H_{10}ClN_3O_4S_2$: C, 28.05; H, 3.36; N, 14.02. Found: C, 28.19; H, 3.41; N, 13.95.

Step C.—By replacing the 5-chloro-2,4-disulfamylaniline and the gamma-carbomethoxybutyryl chloride employed in Example 1 by equivalent quantities of 2-methylsulfamyl-4-sulfamyl-5-chloroaniline and ethoxalyl chloride and following substantially the same procedure described in Example 1 there is obtained 5-chloro-4-sulfamyl-2-methylsulfamyl-N-ethoxalylaniline, M.P. 227–228° C.

Analysis calculated for $C_{11}H_{14}ClN_3O_7S_2$: C, 33.04; H, 3.45; N, 10.53. Found: C, 33.41; H, 3.61; N, 10.52.

EXAMPLE 5

*5-Chloro-2,4-Disulfamyl-N-Butoxalylaniline*

Step A.—Dibutyloxalate, 84 g. (0.415 mole) is admixed with 42.5 g. of potassium acetate and 50 ml. of water and the mixture heated with stirring on the steam bath. The solvent then is removed in vacuo and the residue treated with 100 ml. of ethanol and 250 ml. of ether whereupon a precipitate is formed which is separated by filtration and dried, yielding 69 g. (90%) of butyl potassium oxalate. This product 29.4 g. (0.16 mole) is moistened with a little ether and admixed with stirring with 40 g. (0.34 mole) of thionyl chloride cooled with ice. The reaction mixture then is allowed to warm to room temperature and then heated overnight on the steam bath. The reaction mixture thereafter is chilled and diluted with 100 ml. of ether and filtered. The residue is washed with ether and the filtrate and washing combined and the ether removed by distillation. The residue is vacuum distilled at 125–135° C. at 45 mm. pressure yielding 7 g. of butyl oxalyl chloride.

Step B.—By following the procedure of Example 1 and using an equimolecular quantity of butyl oxalyl chloride in place of the gamma-carbomethoxybutyryl chloride employed in Example 1, there is obtained 5-chloro-2,4-disulfamyl-N-butoxalylaniline which, after recrystallization from a 50% mixture of ethanol and water, melts at 219–220° C.

Analysis calculated for $C_{12}H_{16}ClN_3O_7S_2$: C, 34.82; H, 3.90; N, 10.15. Found: C, 34.60; H, 4.14; N, 10.15.

EXAMPLE 6

*5-Chloro-2,4-Disulfamyl-N-Hexoxalylaniline*

Step A.—Dihexyloxalate, 75 g. (0.28 mole) and potassium acetate 28.6 g. and 30 ml. of water are combined and heated on a water bath with stirring overnight. The solution then is concentrated to 50 ml. and 75 ml. of ethanol plus 200 ml. of ether added whereupon a precipitate is formed which is collected, giving hexyl potassium oxalate. This product 17 g. (0.08 mole) is moistened with a little ether and then added to a cooled solution of thionyl chloride (20 g.). The reaction mixture is heated on a steam bath overnight then cooled and treated with 100 ml. of ether. The precipitate which forms is removed by suction filtration and the residue washed with ether. The washing and filtrate then are combined and concentrated to dryness on the steam bath. The residue then is distilled in vacuo to give 6.8 g. of hexoxalyl chloride, B.P. 90–95° C. at 15 mm. pressure.

Step B.—By following substantially the same procedure described in Example 1 but replacing the gamma-carbomethoxybutyryl chloride there employed by an equimolecular quantity of hexoxalyl chloride, and following substantially the same procedure described in Example 1, there is obtained 5-chloro-2,4-disulfamyl-N-hexoxalylaniline which, after recrystallization from a 50% ethanol-water mixture, melts at 203–204° C.

Analysis calculated for $C_{14}H_{20}ClN_3O_7S_2$: C, 38.04; H, 4.67; N, 9.51. Found: C, 37.84; H, 4.58; N, 9.53.

EXAMPLE 7

*5-Chloro-2,4-Disulfamyl-N-(p-Carbethoxybenzoyl) Aniline*

By replacing the gamma-carbomethoxybutyryl chloride employed in Example 1, by an equimolecular quantity of p-carbethoxybenzoyl chloride, and following substantially the same procedure described in Example 1, there is obtained 5-chloro-2,4-disulfamyl-N-(p-carbethoxybenzoyl)aniline which, after crystallization from a mixture of acetone and petroleum ether, melts at 254–255° C.

Analysis calculated for $C_{16}H_{16}ClN_3O_7S_2$: C, 41.60; H, 3.49; N, 9.10. Found: C, 42.09; H, 3.72; N, 9.03.

EXAMPLE 8

*5-Chloro-2,4-Disulfamyl-N-(Beta-Carbomethoxypropionyl)Aniline*

By replacing the gamma-carbomethoxybutyryl chloride employed in Example 1, by an equimolecular portion of the acid chloride of methyl hydrogen succinate, and following substantially the same procedure described in Example 1, there is obtained 5-chloro-2,4-disulfamyl-N-(beta-carbomethoxypropionyl)aniline, M.P. 190–191° C.

Analysis calculated for $C_{11}H_{14}ClN_3O_7S_2$: C, 33.04; H, 3.53; N, 10.51. Found: C, 33.23; H, 3.53; N, 10.56.

EXAMPLE 9

*5-Chloro-2,4-Disulfamyl-N-Ethoxalylaniline*

A solution of 57 g. (0.2 mole) of 5-chloro-2,4-disulfamylaniline and 30 g. (0.22 mole) of ethoxalyl chloride in 450 ml. of dioxane is heated under reflux for 24 hours, cooled and the product collected on the filter. The product is recrystallized from a 50% mixture of alcohol and water giving 5-chloro-2,4-disulfamyl-N-ethoxalylaniline, M.P. 222–223° C.

Analysis calculated for $C_{10}H_{12}ClN_3O_7S_2$: C, 31.13; H, 3.14; N, 10.89. Found: C, 31.20; H, 3.62; N, 10.69.

EXAMPLE 10

*5-Bromo-2,4-Disulfamyl-N-Ethoxalylaniline*

By replacing the 5-chloro-2,4-disulfamylaniline employed in Example 9 by an equimolecular quantity of 5-bromo-2,4-disulfamylaniline and following substantially the same procedure described in Example 9, there is obtained 5-bromo-2,4-disulfamyl-N-ethoxalylaniline, M.P. 227–228° C.

Analysis calculated for $C_{10}H_{12}BrN_3O_7S_2$: C, 27.91; H, 2.81; N, 9.77. Found: C, 27.84; H, 3.08; N, 9.67.

EXAMPLE 11

*5-Chloro-2,4-Disulfamyl-N,N-Ethoxalylmethylaniline*

A solution of 6.0 g. of 5-chloro-2,4-disulfamyl-N-methylaniline and 3.0 g. of ethoxalyl chloride in 75 ml. of dioxane is heated under reflux for 17 hours and then concentrated to dryness in vacuo. The residue is recrystallized from a mixture of acetone and petroleum ether giving 5 - chloro-2,4-disulfamyl-N,N-ethoxalylmethylaniline, M.P. 175–176° C.

Analysis calculated for $C_{11}H_{14}ClN_3O_7S_2$: C, 33.04; H, 3.53; N, 10.51. Found: C, 33.19; H, 3.79; N, 10.35.

EXAMPLE 12

*5-Chloro-2,4-Disulfamyl-N-Beta-Carbomethoxyacrylylaniline*

By replacing the gamma-carbomethoxybutyryl chloride employed in Example 1, by an equimolecular quantity of the acid chloride of methyl hydrogen maleate and following substantially the same procedure described in Example 1, there is obtained 5-chloro-2,4-disulfamyl-N-β-carbomethoxyacrylylaniline.

EXAMPLE 13

*5,6-Dichloro-2,4-Disulfamyl-N-Ethoxalylaniline*

Step A.—5-chloro-2,4-disulfamylaniline (25.7 g., 0.09 mole) is suspended in a mixture of water (100 ml.), acetic acid (200 ml.) and concentrated hydrochloric acid (150 ml.) and heated on the steam bath with stirring until complete solution is obtained. The solution is cooled to 75° C. and 30% hydrogen peroxide (9 ml.) is added. The mixture is allowed to come to room temperature with stirring, then cooled in an ice bath and the precipitate collected on the filter, washed with water and dried to give 16 g. of 5,6-dichloro-2,4-disulfamylaniline. After recrystallization from a 6% mixture of alcohol and water, there is obtained colorless needles melting at 288–289° C.

Step B.—A solution of 0.2 mole of the thus obtained product and 0.22 mole of ethoxalyl chloride in 450 ml. of dioxane is heated under reflux for about 5 hours, cooled and the product collected on the filter. The product is recrystallized from a 50% alcohol-water mixture to give 5,6-dichloro-2,4-disulfamyl-N-ethoxalylaniline.

EXAMPLE 14

*5-Butyl-2,4-Di-(N-n-Butylsulfamyl)-N-Ethoxalylaniline*

Step A.—m-Butylaniline (0.5 mole) is added portionwise with stirring to 375 ml. of chlorosulfonic acid in a 3-liter, round-bottomed, 3-necked flask cooled in an ice bath. Sodium chloride (350 g.) is added portionwise over a period of one to two hours and the mixture then heated gradually in an oil bath to 150° C. After three hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-butylaniline-2,4-disulfonyl chloride is obtained. After recrystallization from a mixture of benzene and hexane the product melts at 130–132° C. The disulfonyl chloride then is added portionwise to n-butylamine (50 ml.) and heated for approximately 1 hour on the steam bath. After cooling to room temperature, the solid product is collected on the filter, washed with water and crystallized from a mixture of alcohol and water to give 5-butyl-2,4-di(N-n-butylsulfamyl)-aniline.

Step B.—A solution of 0.2 mole of the thus obtained product and 0.22 mole of ethoxalyl chloride in 450 ml. of dioxane is heated under reflux for about 24 hours, cooled and the product collected on the filter. The product is recrystallized from a mixture of 50% alcohol and water to give 5-butyl-2,4-di-(N-n-butylsulfamyl)-N-ethoxalylaniline.

EXAMPLE 15

*5-Methoxy-2,4-Disulfamyl-N-Butoxalylaniline*

A solution of 0.2 mole of 5-methoxy-2,4-disulfamylaniline and 0.22 mole of butoxalyl chloride in 450 ml. of dioxane is heated under reflux for approximately 24 hours, cooled and the product collected on the filter. After recrystallization from a mixture of 50% alcohol and water there is obtained 5-methoxy-2,4-disulfamyl-N-butoxalylaniline.

EXAMPLE 16

*5-Propoxy-2,4-Di-(N,N-Dimethylsulfamyl)-N-Ethoxalylaniline*

Step A.—m-Propoxyaniline (0.5 mole) is added portionwise with stirring to 375 ml. of chlorosulfonic acid in a 3-liter, round-bottomed, 3-necked flask, cooled in an ice bath. Sodium chloride (350 g.) is added portionwise over a period of one to two hours and the mixture then heated gradually in an oil bath to 150° C. After 3 hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-propoxyaniline-2,4-disulfonyl chloride is obtained and is recrystallized from a mixture of benzene and hexane. The disulfonyl chloride thus obtained is added portionwise to 25% aqueous dimethylamine (50 ml.) and heated for aproximately 1 hour on the steam bath. After cooling at room temperature, the solid product is collected on the filter and washed with water to give 2,4-di-(N,N-dimethylsulfamyl)-5-propoxyaniline.

Step B.—A solution of 0.2 mole of the thus obtained product and 0.22 mole of ethoxalyl chloride in 450 ml. of dioxane is heated under reflux for aproximately 24 hours, cooled and the product collected on the filter. The product is recrystallized from a 50% alcohol and water mixture to give 5-propoxy-2,4-di-(N,N-dimethylsulfamyl)-N-ethoxalylaniline.

EXAMPLE 17

*4-Chloro-2,5-Disulfamyl-N-Ethoxalylaniline*

A solution of 0.2 mole of 4-chloro-2,5-disulfamyl aniline and 0.22 mole of ethoxalyl chloride in 450 ml. dioxane is heated under reflux for approximately 24 hours, cooled and the product collected on the filter to give 4-chloro-2,5-disulfamyl-N-ethoxalylaniline.

EXAMPLE 18

*2,4-Disulfamyl-N-(7'-Carbomethoxyheptanoyl)Aniline*

A solution of 0.2 mole of 2,4-disulfamylaniline and 0.22 mole of the acid chloride of methyl hydrogen suberate in 450 ml. of dioxane is heated under reflux for approximately 24 hours, cooled and the product collected on the filter to give 2,4-disulfamyl-N-(7'-carbomethoxyheptanoyl)aniline.

EXAMPLE 19

*5-Nitro-2,4-Disulfamyl-N-Ethoxalylaniline*

A solution of 0.2 mole of 5-nitro-2,4-disulfamylaniline and 0.22 mole of ethoxalyl chloride in 450 ml. of dioxane is heated under reflux for about 24 hours, cooled and the product collected on the filter to give 5-nitro-2,4-disulfamyl-N-ethoxalylaniline.

EXAMPLE 20

*5-Chloro-6-Methyl-2,4-Disulfamyl-N-Ethoxalylaniline*

Step A.—2-methyl-3-chloroaniline (0.5 mole) is added portionwise with stirring to 375 ml. of chlorosulfonic acid in a 3-liter, round-bottomed, 3-necked flask cooled in an ice bath. Sodium chloride (3.50 g.) is added portionwise over a period of one to two hours and the mixture then heated gradually in an oil bath to 150° C. After 3 hours at 150–160° C., the flask is cooled thoroughly in an ice bath and the contents treated with a liter of cold water. The product is extracted with ether and the extract washed with water and dried over sodium sulfate. The product, 5-chloro-6-methylaniline-2,4-disulfonyl chloride is obtained by removal of the ether on the steam bath. The disulfonyl chloride is added portionwise to 50 ml. of 28% ammonium hydroxide and heated for approximately one hour on the steam bath. After cooling to room temperature, the solid product is collected on the filter to give 5-chloro-6-methyl-2,4-disulfamylaniline.

*Step B.*—A solution of 0.2 mole of the thus obtained product and 0.22 mole of ethoxalyl chloride in 450 ml. of dioxane is heated under reflux for about 24 hours, cooled and the product collected on the filter to give 5-chloro-6-methyl-2,4-disulfamyl-N-ethoxalylaniline.

The novel compounds of this invention are effective diuretic and/or saluretic agents. Because of this property, they are useful in therapy for the treatment of any condition resulting from an excessively high concentration of sodium in the body such as in the treatment of edematous conditions resulting, for example, from congestive heart failure.

The dosage of the novel compounds of this invention will vary over a wide range depending upon the age and weight of the patient to be treated and also depending upon the particular ailment to be treated. For these reasons tablets, pills, capsules and the like containing, for example, 100, 150, 250, 500 mg. of active ingredient can be made available for the symptomatic adjustment of the dosage to the individual patient. These dosages appear to be well below the toxic dose of the novel compounds of this invention as evidenced by the acute intravenous $LD_{50}$ in mice of one of the compounds falling within the scope of this invention, that is, of the compound 5-chloro-2,4,disulfamyl-N-ethoxalylaniline, which is found to be 1,296 mg./kg. of body weight when administered in the form of its sodium salt, and when administered orally admixed with carboxymethylcellulose the $LD_{50}$ is found to be greater than 10 g./kg. of body weight.

As each of the compounds of this invention can be incorporated in a dosage form similar to that described in the following example or in other dosage forms suitable for oral or parenteral administration which can be prepared by well-known methods, only one example is included herein to illustrate the preparation of a representative dosage form.

EXAMPLE 21

*Dry-Filled Capsules Containing 150 Mg. of Active Ingredient Per Capsule*

| | Per capsule, mg. |
|---|---|
| 5-chloro-2,4-disulfamyl-N-ethoxalylaniline | 150 |
| Lactose | 125 |

Capsule size No. 2.

The 5-chloro-2,4-disulfamyl-N-ethoxalylaniline is reduced to a No. 60 powder, lactose then is passed through a No. 60 bolting cloth onto the powder. The combined ingredients are admixed for 10 minutes and then filled into No. 2 dry gelatin capsules.

While the novel compounds of this invention are of particular interest because of their diuretic and/or saluretic properties, they are of importance also because they can be used to prepare sulfamyl-substituted benzothiadiazine-1,1-dioxide compounds having attached to the 3-position an ester of an aliphatic or aromatic mono-carboxylic acid. These cyclized compounds also possess diuretic properties and which can be hydrolyzed to the free acid which also possess diuretic properties. The preparation of these compounds is more fully described in Serial No. 78,267 filed by myself on December 27, 1960. In general, the compounds of this invention can be cyclized by treatment with an alcoholic solution of a tertiary amine. The reaction takes place at room temperature or if desired the reaction mixture can be heated. For example, a solution of 2.0 g. of 5-chloro-2,4-disulfamyl-N-(beta-carbomethoxypropionyl)aniline, prepared as described in Example 1, in 50 ml. of 25% methanolic trimethylamine is allowed to stand at room temperature for about 24 hours whereupon it is concentrated to dryness in vacuo to give 3-(beta-carbomethoxyethyl)-6-chloro-7-sulfamyl-1,2-4 benzothiadiazine-1,1-dioxide which, after crystallization from methanol, has a melting point of 266–267° C.

As all of the novel compounds of this invention can be converted to the cyclized product by substantially the same method described above, no additional examples are included as to do so it would merely lengthen the disclosure without materially adding to its teaching.

While the above examples describe the preparation of certain compounds which are illustrative of the novel compounds of this invention, and a certain specific dosage form suitable for administering the novel compounds, and a certain process by which the novel compounds of this invention can be cyclized to form the corresponding sulfamyl-3-substituted 1,2,4-benzothiadiazine-1,1-dioxides, it is to be understood that the invention is not to be limited to the specific compounds described in the examples or by the specific reaction conditions described for the preparation of these compounds or by the specific ingredient included in the pharmaceutical preparation, but is to be understood to embrace variations and modifications thereof which fall within the scope of the appended claims.

What is claimed is:

1. Esters of disulfamyl-N-carboxyacylaniline wherein at least one sulfamyl group is in ortho-position to the aniline amino group, and wherein the carboxyacyl ester group is selected from the group consisting of lower-alkyl ester of hydroxyoxalyl, lower-alkyl ester of carboxy-lower-alkyl-carbonyl, lower-alkyl ester of carboxy-lower alkenylcarbonyl, and lower-alkyl ester of carboxyphenylenecarbonyl.

2. A compound of the formula

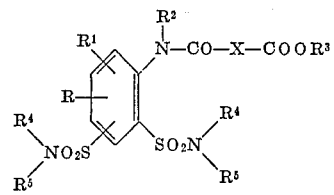

wherein R is selected from the group consisting of hydrogen, halogen, lower alkyl, lower alkoxy and nitro; $R^1$ is selected from the group consisting of hydrogen, lower alkyl and halogen; $R^2$ is selected from the group consisting of hydrogen and lower alkyl; X is selected from the group consisting of $(CH_2)_n$ wherein $n$ is zero to six, lower alkenylene and phenylene; $R^3$ is lower alkyl; and $R^4$ and $R^5$ each is selected from the group consisting of hydrogen and lower alkyl.

3. 5-halo-2,4-disulfamyl-N-(lower-alkoxalyl)aniline.

4. 5 - halo - 2,4-di-(N-lower-alkylsulfamyl)-N-(lower-alkoxalyl)aniline.

5. 5-chloro-2,4-disulfamyl-N-ethoxalylaniline.

6. 5-trifluoromethyl-2,4-disulfamyl-N-ethoxalylaniline.

7. 5-bromo-2,4-disulfamyl-N-ethoxalylaniline.

8. 5-chloro-2,4-disulfamyl-N-butoxalylaniline.

9. 5 - halo-2,4-disulfamyl-N-(omega-carboalkoxy-alkanoyl)aniline wherein said alkoxy and alkanoyl are lower alkoxy and lower alkanoyl.

10. 5 - halo - 2,4-disulfamyl-N-(carboalkoxybenzoyl)-aniline wherein the alkoxy group is lower alkoxy.

11. 5-lower alkyl-2,4-disulfamyl-N-(lower-alkoxalyl)-aniline.

12. 5-lower alkoxy-2,4-disulfamyl-N-(lower-alkoxalyl)-aniline.
13. 5-nitro-2,4-disulfamyl-N-(lower alkoxalyl)-aniline.
14. 5-halo-7-lower alkyl-2,4-disulfamyl-N-(lower-alkoxalyl)aniline.
15. 5-chloro-6-methyl-2,4-disulfamyl-N-ethoxalylaniline.

References Cited in the file of this patent
UNITED STATES PATENTS
2,965,675   Novello _____ Dec. 20, 1960
OTHER REFERENCES
Petyunim et al.: Zhur. Obschei Khim., volume 27, pages 1544–7 (1957).